April 27, 1943. B. F. ARPS 2,317,578

POWER PICK-UP AND DUMPING ATTACHMENT FOR TRACTORS

Filed Feb. 14, 1941 2 Sheets-Sheet 1

INVENTOR
BRUNO F. ARPS
BY A.S.Kroh
ATTORNEY

April 27, 1943.   B. F. ARPS   2,317,578
POWER PICK-UP AND DUMPING ATTACHMENT FOR TRACTORS
Filed Feb. 14, 1941   2 Sheets-Sheet 2

INVENTOR
BRUNO F. ARPS
BY A.S.Kroh
ATTORNEY

Patented Apr. 27, 1943

2,317,578

UNITED STATES PATENT OFFICE 2,317,578

POWER PICKUP AND DUMPING ATTACHMENT FOR TRACTORS

Bruno F. Arps, New Holstein, Wis., assignor to Arps Corporation, New Holstein, Wis., a corporation of Wisconsin Application February 14, 1941, Serial No. 378,909

8 Claims. (Cl. 37—128)

The present invention relates to devices commonly called scrapers which are adapted to be detachably connected to tractors and being controlled by a power lifting device whereby the operator can conveniently control the digging, picking up and dumping operations.

My invention is particularly adapted to tractors having preferably a hydraulic power lift which may form a part of the standard tractor equipment and wherein the scraper is always under the complete control of the operator.

An object of my invention is to provide a scraper attachment which can be secured to and removed from the tractor without making changes in the standard equipment of the tractor.

A still further object of the present invention is to provide a device which will be almost instantaneous in its action and whereby its operations need not interfere with the directional and speed control of the tractor.

Generally stated, the objects of the present invention are to provide a device which will move the maximum amount of dirt in a minimum length of time and in a most economical and convenient manner and to provide an attachment which can be manufactured at low cost and is durable and reliable.

The above mentioned objects are accomplished by means of parts, combinations of parts, or their equivalents, and mode of operation, as hereinafter set forth and claimed and shown in the accompanying drawings in which:

Figure 1:
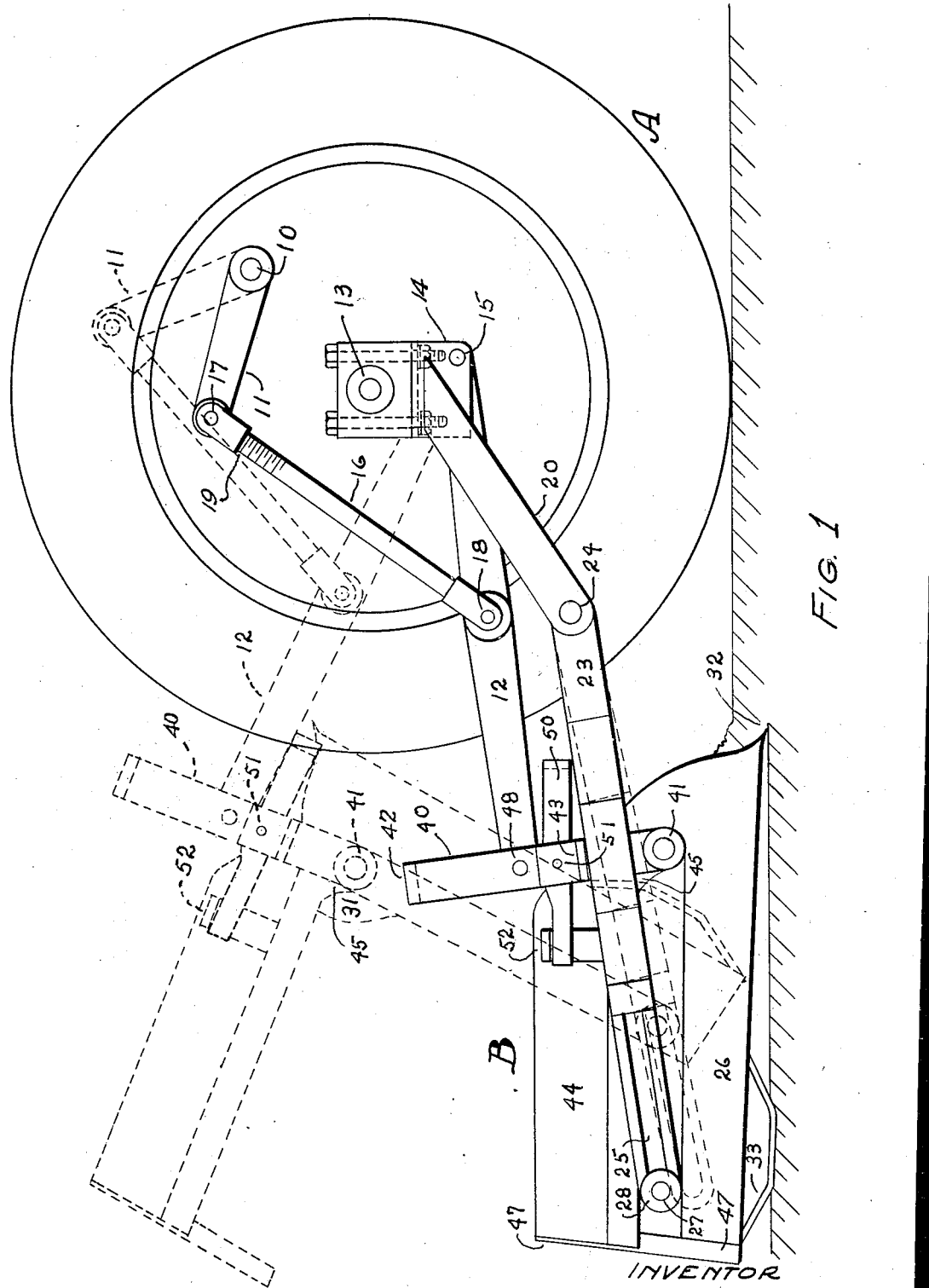
Fig. 1 is a side elevational view of one form of my device and when in a loading position, the tractor being shown fractionally and illustrating the position of the device while dumping, by dotted lines.
Figure 2:
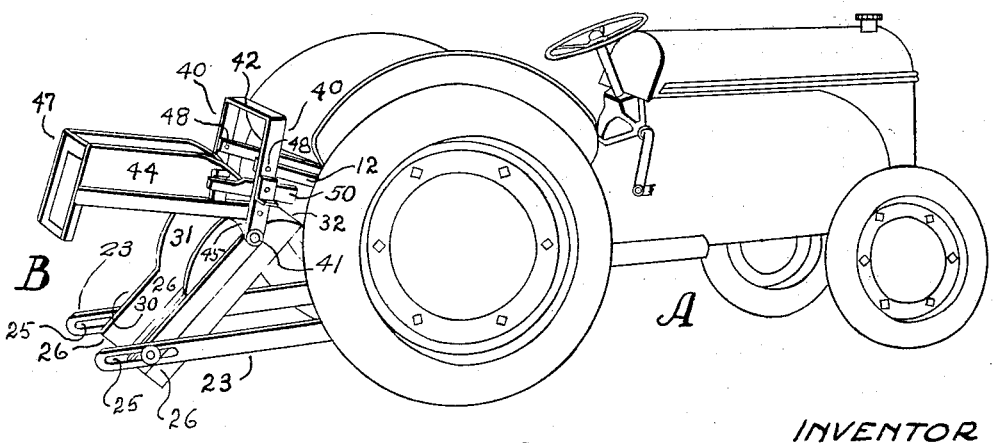
Fig. 2 is a perspective view of my device as shown in Figure 1 and showing the device in a dumping position and attached to a well known tractor.

As thus illustrated, in Figures 1 and 2, the tractor, in its entirety, is designated by reference character A and my improved device, in its entirety, is designated by reference character B.

Tractor A is preferably provided with a hydraulic power lift (not shown) which is operatively connected to a transverse shaft 10 and adapted to oscillate this shaft and hold it in any desired position. The lifting device is provided with a hydraulic pump and a hand operated valve (not shown) whereby the tractor operator can manipulate the valve and move shaft 10 in its bearings to its extreme positions or hold it in any medial position. Power lifts of the class are too well known to require further description.

One well known tractor, as illustrated in Figure 2, is supplied with the power lift and shaft 10 as standard equipment.

Shaft 10 carries on opposite ends thereof rearwardly extending arms 11—11 (one not shown). In Figure 1, arms 11 are indicated as being in position for loading the scraper and this member, and other parts of the scraper attachment are designated by dotted lines, indicating the positions required for dumping. Therefore the dotted lines indicate substantially the highest position of arms 11. Clearly arms 11 may be raised or lowered at their rear ends for more or less depth of cut, as will hereinafter appear.

Intermediate spaced arms 12—12 (one not shown) are arranged substantially in vertical alignment with arms 11 and are preferably hinged to the axle housing 13 by means of brackets 14—14 (one not shown) as at 15.

The rear ends of arms 11 are operatively connected to arms 12 by means of links 16—16 (one not shown) as at 17 and 18, the ends of the links having forked brackets, as illustrated, one end of each link being screw threaded into its bracket as at 19. Thus shaft 10, as will be seen by scrutinizing Figure 1, may be turned by the power lift so as to raise or lower the rear ends of arms 12, as indicated in the figures; and the relative position of arms 11 and 12 may be changed somewhat by means of the screw threaded connection 19.

Two rearwardly and downwardly extending draw bars 20—20 (one not shown) are rigidly secured at their front ends preferably to brackets 14 as illustrated in Figure 1. I may elect to make use of the standard transverse tractor draw bar, wherein members 20 will be very short and in the form of brackets which are secured to the ends of this standard draw bar.

The rear ends of members 20 are hingedly connected to the front ends of straps 23—23 as at 24. The rear ends of members 23 are provided with slots 25. The main or base portion of the scraper is U-shaped having side plates 26—26 which are provided with pins 27 which rotatably and slidably extend through slots 25, each having a washer 28 to prevent the pins from leaving the slots.

Slots 25 are positioned so when the scraper is in its lowest position, straps 23 will act as draw bars. Members 26 terminate at their tops as at 30, the forward ends having raises 31—31 (see Figure 2) for a purpose which will hereinafter appear. Members 26, with the bottom of the scraper, form a trough, the front end having a scraper cutting blade as at 32.

I provide runners 33 which act as supports for the rear end of the scraper while loading, as illustrated in Figure 1 and while transporting the load when the front end of the scraper is raised slightly above the ground surface for the purpose.

I provide upwardly extending links 40—40 the lower ends being hingedly connected to members 26 as at 41, the tops being preferably connected together by a transverse member 42. These members are preferably formed from a single piece of bar stock.

Outwardly extending stops 43—43 are secured to links 40 and are adapted to lie on members 23 when the scraper blade is in its lowest position relative to these members so runners 33 and the tractor wheels determine the maximum depth cut by the scraper.

I hingedly mount upper side members 44—44 on members 26, as at 41; members 44 having downwardly projecting portions 45 for the purpose. These members are adapted to lie against the sides of members 26 and loosely contact the outside surfaces of members 31. Members 44 will therefore be held in positive alignment with members 26.

I provide a rear end gate 47 for the rear ends of members 44 which extends downwardly so as to form a closure for the rear end of the scraper base or trough. Arms 12 are pivoted to links 40 as at 48. Thus it will be seen that when members 44 are in the position shown in Figure 1, the scraper will be filled with material when the tractor moves forwardly.

I provide links 50—50 which are hingedly mounted midway their length on members 40 as at 51. The forward ends of links 50 are in alignment with arms 12, the rear ends being in vertical alignment with stops 52 which are secured to members 44. Thus when arms 12 move upwardly to a predetermined point, they will contact the forward ends of links 50, causing the rear ends of the links to contact members 52 and thus lift the rear ends of members 44 on their hinges 41, as illustrated by dotted lines in Figure 1, and permit the scraper base to assume the position shown.

Clearly links 50 and stops 52 may be designed and positioned so the material in the scraper will flow out of the scraper by gravity at any predetermined position of the scraper which will preferably be when arms 11 are in their highest position.

When it is desired to transport a load, the front end of the scraper is lifted clear of the ground so runners 33 will act to largely support the weight of the load. Clearly therefore, link 50 does not come into action until the front end of the scraper is lifted considerable higher than transporting position.

Figure 3:
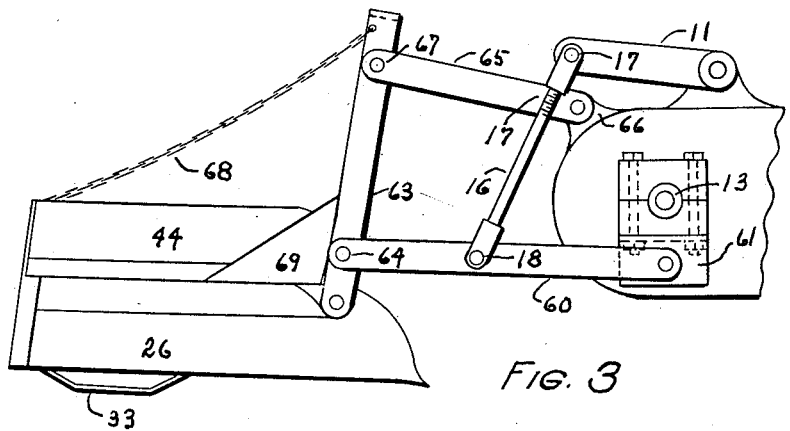
Fig. 3 illustrates a modification, showing the scraper in position for loading.
Figure 4:
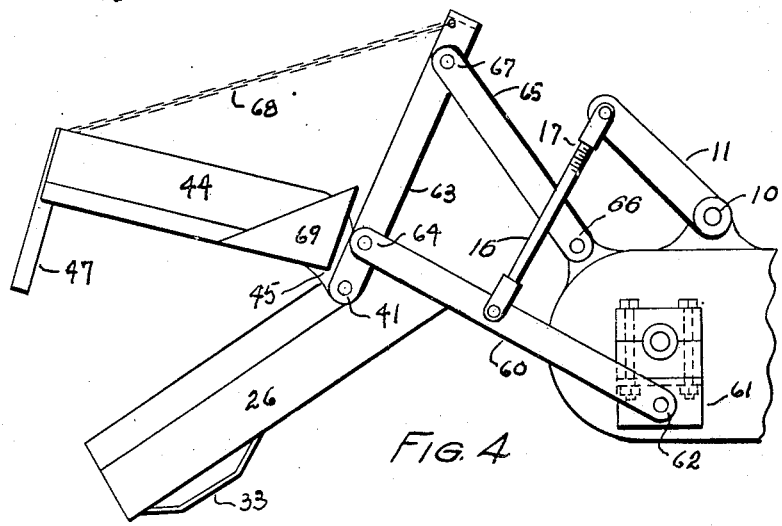
Fig. 4 illustrates the modification shown in Figure 3, the scraper being in a dumping position.

In Figures 3 and 4, I illustrate a modification wherein members 26, 44, 45 and 47 are similar to that shown in Figures 1 and 2. However members 20, 23 and 28 are dispensed with and links 60 are hingedly mounted on brackets 61 as at 62, the connection between member 60 and arms 11 being similar to the connection shown in Figure 1.

I provide links 63—63 which are hinged to members 26 as at 41 and connected together at their tops similar to members 40 in Figure 1. Links 60 are pivotally connected to links 63 as at 64 or this pivotal connection may be at 41. Spaced links 65—65 (one not shown) are hingedly connected to the tractor frame as at 66 and to links 63 as at 67. Thus it will be seen that the position of link 63 will be determined by the position of members 60 and 65.

I provide chains 68, each connected preferably to the top of a link 63, the other ends being connected to the adjacent rear upper corners of members 44. Thus the chain will act to prevent members 44 from following member 26 when the device is raised as illustrated in Figure 4 but will permit members 44 to lie on members 26 when in a loading or transporting position.

On the forward ends of members 44, I secure brackets 69—69 (one not shown) which are positioned and shaped as illustrated. These brackets at their tops will contact members 63 and act to force member 44 into loading position, as illustrated in Figure 3. Thus it will be seen that the design shown in Figures 3 and 4 will operate very similar to the design shown in Figures 1 and 2.

In Figures 1 to 4, inclusive, links 40 and 63 extend upwardly in parallel relation and therefore it will require either two arms 12 or two arms 65 to control these links. It will be understood that one of these arms may be dispensed with by moving the other arm in a transversely central position.

Clearly many minor detail changes may be made without departing from the spirit and scope of the present invention, as recited in the appended claims.

Having thus shown and described my invention, I claim:

1. A device of the class described, comprising a tractor having transversely spaced draw bar connections rigidly attached thereto, a power lift secured to the tractor frame and having transversely spaced rearwardly extending arms operatively connected thereto, their rear ends adapted to be oscillated vertically thereby, rearwardly extending straps pivotally mounted at their front ends to said draw bar connections and having at their rear ends elongated slots, a scraper bucket positioned between said straps and having pins near its rear end which slidably and rotatably extend through said slots, the rear ends of said rearwardly extending arms having hinged link connections to the forward end of said scraper whereby said forward end may be lowered and raised to loading and dumping positions and to intermediate positions by said power lift.

2. A device as recited in claim 1 including; runners secured to the bottom of said scraper near the rear end thereof and adapted to act as a sliding support for said scraper when loading and when its front end is raised above the ground surface for transporting the load.

3. A device as recited in claim 1 including; stops on said links adapted to contact said straps and limit the downward movement of the front end of said scraper relative to the straps.

4. A device of the class described, comprising a tractor having transversely spaced draw bar connections rigidly attached thereto, a power lift secured to the frame of said tractor and having transversely spaced rearwardly extending arms, the free ends adapted to be oscillated vertically by said power lift, rearwardly extending straps pivotally mounted at their front ends to said draw bar connections and having at their rear ends elongated slots, an open rear end scraper base positioned between said straps and having pins near its rear end which slidably and rotatably extend through said slots and adapted to engage the rear end thereof when said scraper is in its loading and transporting positions, intermediate spaced arms having their front ends pivotally mounted to said tractor, links forming an operating connection between the rear ends of said first arms and said intermediate arms, vertically extending links having their lower ends pivotally mounted to the front end of said base and being pivotally connected to the rear ends of said intermediate arms a distance above their base pivots, supplemental side members pivotally mounted at their front ends to the front end of said scraper and being adapted to lie on the top edges of the side members of said base and having a rear end gate which extends downwardly forming a closure for the rear end of said base, trip arms pivotally mounted on said links intermediate their ends, stops on said supplemental side members, said trip arms positioned whereby when the front end of said scraper reaches a predetermined height, their front ends will contact said intermediate arms and cause their rear ends to contact said stops to thereby lift said supplemental side members lid-like relative to said base.

5. A device as recited in claim 4 including; runners secured to the bottom of said base near the rear end thereof and adapted to act as a support therefor while loading and transporting.

6. A device as recited in claim 4 including; stops on said links adapted to contact said straps and limit the downward movement of the forward end of said base relative to said straps.

7. A device of the class described, comprising a tractor having transversely spaced draw bar connections rigidly attached thereto, a power lift secured to the tractor frame and having transversely spaced rearwardly extending arms operatively connected thereto, their rear ends adapted to be oscillated vertically thereby, rearwardly extending straps pivotally mounted at their front ends to said draw bar connections and having at their rear ends elongated slots, a scraper bucket positioned between said straps and having pins near its rear end which slidably and rotatably extend through said slots, the rear ends of said rearwardly extending arms having hinged link connections to the forward end of said scraper whereby said forward end may be lowered and raised to loading and dumping positions and to intermediate positions by said power lift, said slots adapted to limit the forward and rearward movement of said scraper bucket relative to the tractor.

8. A device of the class described, comprising a tractor having transversely spaced draw bar connections rigidly attached thereto, a power lift secured to the frame of said tractor and having transversely spaced rearwardly extending arms, the free ends adapted to be oscillated vertically by said power lift, rearwardly extending straps pivotally mounted at their front ends to said draw bar connections and having at their rear ends elongated slots, an open rear end scraper base positioned between said straps and having pins near its rear end which slidably and rotatably extend through said slots, intermediate spaced arms having their front ends pivotally mounted to said tractor, links forming an operating connection between the rear ends of said first arms and said intermediate arms, vertically extending links having their lower ends pivotally mounted to the front end of said base and being pivotally connected to the rear ends of said intermediate arms a distance above their base pivots, supplemental side members pivotally mounted at their front ends to the front end of said scraper base and having a rear end gate which extends downwardly forming a closure for the rear end of said base, means whereby when the front end of said scraper reaches a predetermined height, a further movement will lift said supplemental side members lid-like relative to said base, said slots adapted to limit the forward and rearward movement of said scraper base relative to the tractor.

BRUNO F. ARPS.